(12) United States Patent
Kawahara

(10) Patent No.: US 11,364,544 B2
(45) Date of Patent: Jun. 21, 2022

(54) METHOD AND DEVICE FOR PERFORMING ADDITIVE MANUFACTURING WHILE ROTATING A SPINDLE

(71) Applicant: MITSUBISHI HEAVY INDUSTRIES COMPRESSOR CORPORATION, Tokyo (JP)

(72) Inventor: Kosei Kawahara, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 231 days.

(21) Appl. No.: 16/481,687

(22) PCT Filed: Feb. 24, 2017

(86) PCT No.: PCT/JP2017/007139
§ 371 (c)(1),
(2) Date: Jul. 29, 2019

(87) PCT Pub. No.: WO2018/154719
PCT Pub. Date: Aug. 30, 2018

(65) Prior Publication Data
US 2019/0358705 A1  Nov. 28, 2019

(51) Int. Cl.
*B22F 7/08* (2006.01)
*B22F 12/00* (2021.01)
(Continued)

(52) U.S. Cl.
CPC ............. *B22F 12/00* (2021.01); *B22F 10/10* (2021.01); *B33Y 10/00* (2014.12); *B33Y 30/00* (2014.12)

(58) Field of Classification Search
None
See application file for complete search history.

(56) References Cited

U.S. PATENT DOCUMENTS

2008/0014457 A1* 1/2008 Gennaro ............... B23P 15/002
428/546
2014/0169971 A1* 6/2014 Vedula ................ F04D 29/2227
416/185
(Continued)

FOREIGN PATENT DOCUMENTS

JP  2005-059324 A  3/2005
JP  2015-510979 A  4/2015
(Continued)

OTHER PUBLICATIONS

International Search Report and Written Opinion in corresponding International Application No. PCT/JP2017/007139, dated Apr. 18, 2017 (11 pages).

*Primary Examiner* — Quana Grainger
(74) *Attorney, Agent, or Firm* — Osha Bergman Watanabe & Burton LLP

(57) ABSTRACT

An additive manufacturing method includes forming a shaped body by repeating: a material feeding step of forming a powder layer by feeding a shaping material that includes a metal powder onto a base that is provided outside a spindle in a radial direction thereof while rotating the spindle provided to be rotatable about a center axis; and a beam irradiating step of solidifying the shaping material by irradiating a prescribed area of the powder layer with a beam.

6 Claims, 6 Drawing Sheets

(51) Int. Cl.
*B33Y 10/00* (2015.01)
*B33Y 30/00* (2015.01)
*B22F 10/10* (2021.01)

(56) References Cited

U.S. PATENT DOCUMENTS

| | | |
|---|---|---|
| 2015/0017013 A1 | 1/2015 | Tozzi et al. |
| 2016/0101470 A1* | 4/2016 | Kamakura ............ B29C 64/153 |
| | | 419/5 |
| 2017/0209958 A1 | 7/2017 | Soshi |
| 2018/0065181 A1 | 3/2018 | Mori et al. |
| 2019/0151990 A1* | 5/2019 | Mezawa ............ B23K 26/1464 |

FOREIGN PATENT DOCUMENTS

| | | |
|---|---|---|
| JP | 2015-196268 A | 11/2015 |
| JP | 2016-037901 A | 3/2016 |
| JP | 2016-078205 A | 5/2016 |
| JP | 2016-175152 A | 10/2016 |

\* cited by examiner

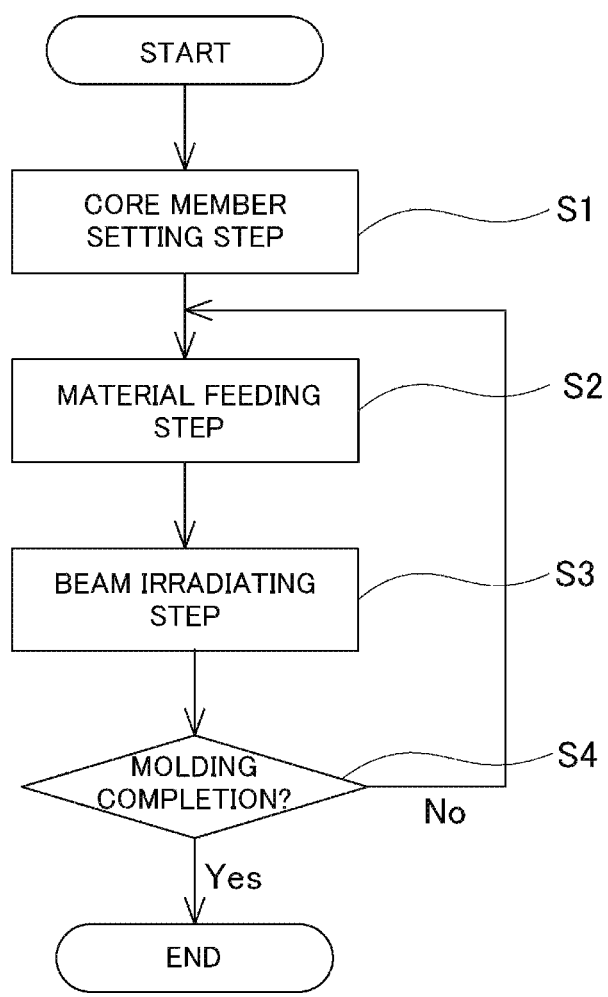

METHOD AND DEVICE FOR PERFORMING ADDITIVE MANUFACTURING WHILE ROTATING A SPINDLE

TECHNICAL FIELD

The present invention relates to an additive manufacturing method and an additive manufacturing device.

BACKGROUND ART

For example, an impeller used in a rotating machine such as a centrifugal compressor includes a disk, blades, and a cover. The disk is fixed to a rotating shaft provided in a rotating machine. The plurality of blades are provided on a surface of the disk at intervals in a circumferential direction. The cover covers these blades from a side opposite from the disk. The impeller serves as a flow path through which a fluid flows between the disk, the cover, and the blades adjacent to each other in the circumferential direction.

For example, Patent Document 1 discloses a method for forming an impeller using an additive manufacturing method. The additive manufacturing method includes sintering a metal powder placed in accordance with a desired shape of the impeller using thermal energy such as a laser or an electron beam. By sequentially repeating steps such as placement and sintering of the metal powder, the sintered metal powder is laminated to form an impeller having a desired shape.

CITATION LIST

Patent Literature

Patent Document 1

Japanese Unexamined Patent Application, First Publication No. 2016-37901

SUMMARY OF INVENTION

Technical Problem

A flow path having a complicated curved surface therein is formed in the impeller. In the additive manufacturing method, because a metal is laminated from the lower side to the upper side, it is difficult to form a complicated curved surface in accordance with an inclination angle. On the other hand, in order to form a complicated curved surface using the additive manufacturing method, it is conceivable to incline the attitude of the impeller during additive manufacturing. However, as a result of setting the attitude of the impeller so that a specific part can be shaped, it may be difficult to form other parts in some cases. In this way, there is demand to improve the formability when shaping a shaped body having a complicated shape like an impeller by additive manufacturing.

The present invention is for the purpose of providing an additive manufacturing method and an additive manufacturing device capable of improving the moldability of a shaped body having a complicated shape.

Solution to Problem

An additive manufacturing method according to a first aspect of the present invention includes: forming a shaped body by repeating: a material feeding step of forming a powder layer by feeding a shaping material which includes a metal powder onto a base which is provided outside a spindle in a radial direction thereof while rotating the spindle provided to be rotatable about a center axis; and a beam irradiating step of solidifying the shaping material by irradiating a prescribed area of the powder layer with a beam.

According to such a constitution, it is possible to form members such as disk-like, annular, and tubular members by sequentially performing additive manufacturing while rotating a spindle. Even when the shaped body has portions which extend greatly in a direction intersecting a central axis direction of the spindle like a disk and a cover of an impeller therein, by performing additive manufacturing while rotating, it is possible to perform the additive manufacturing of these parts from the inside toward the outside in the radial direction. Thus, it is possible to mold a shaped body having a complicated shape which has been conventionally difficult to form.

According to an additive manufacturing method according to a second aspect of the present invention, in the first aspect, the material feeding step may include rotating the spindle over a rotation angle of a beam width or less of the beam.

According to such a constitution, when the step of radiating the beam for melting the shaping material is repeated, the irradiation ranges of the beams overlap each other. Thus, it is possible to melt the fed mold material while rotating the spindle without seams to form the shaped body. Therefore, it is possible to obtain a uniform shaped body.

In an additive manufacturing method according to a third aspect of the present invention, in the first or second aspect, the shaping material may be in a slurry state having a viscosity within a prescribed range.

According to such a constitution, it is possible to prevent the shaping material fed to the base from flowing downward in the vertical direction when the spindle rotates.

In an additive manufacturing method according to a fourth aspect of the present invention, in any one of the first to third aspects, the material feeding step may include forming the powder layer, using an outer circumferential surface of a core member which is in a tubular shape installed in the spindle and forms a part of the shaped body, as the base.

According to such a constitution, by forming the shaping material on the core member installed in the spindle, it is possible to form the shaping material satisfactorily using this core member as the base.

In an additive manufacturing device according to a fifth aspect of the present invention, an additive manufacturing device includes: a spindle provided to be rotatable about a center axis; a spindle driving unit which is configured to rotate the spindle; a material feeding unit which is configured to feed a shaping material containing a metal powder onto a base provided outside the spindle in a diameter direction to form a powder layer; and a beam irradiation unit which is configured to irradiate a prescribed area of the powder layer formed by the material feeding unit with a beam for solidifying the shaping material.

According to such a constitution, the shaping material is fed onto the base by the material feeding unit while the spindle is rotated by the spindle driving unit. By radiating a beam using the beam irradiation unit, the fed shaping material is solidified. Thus, the metal layer which constitutes a part of the shaped body is formed. Therefore, by laminating metal layers to be sequentially formed in the circumferential direction outside of the spindle in the radial direction from the inside thereof in the radial direction toward the outside thereof, it is possible to form the shaped body.

In an additive manufacturing device according to a sixth aspect of the present invention, in the fifth aspect, the additive manufacturing device may further include a film thickness adjustment unit which is configured to adjust a film thickness of the powder layer formed by the material feeding unit.

According to such a constitution, it is possible to increase or decrease a film thickness of the shaping material to be formed through one instance of additive manufacturing.

Advantageous Effects of Invention

According to the present invention, it is possible to improve the moldability of a shaped body having a complicated shape.

BRIEF DESCRIPTION OF DRAWINGS

FIG. 6 is a flowchart showing a flow of an additive manufacturing method according to the embodiment of the present invention.

DESCRIPTION OF EMBODIMENTS

Figure 1:
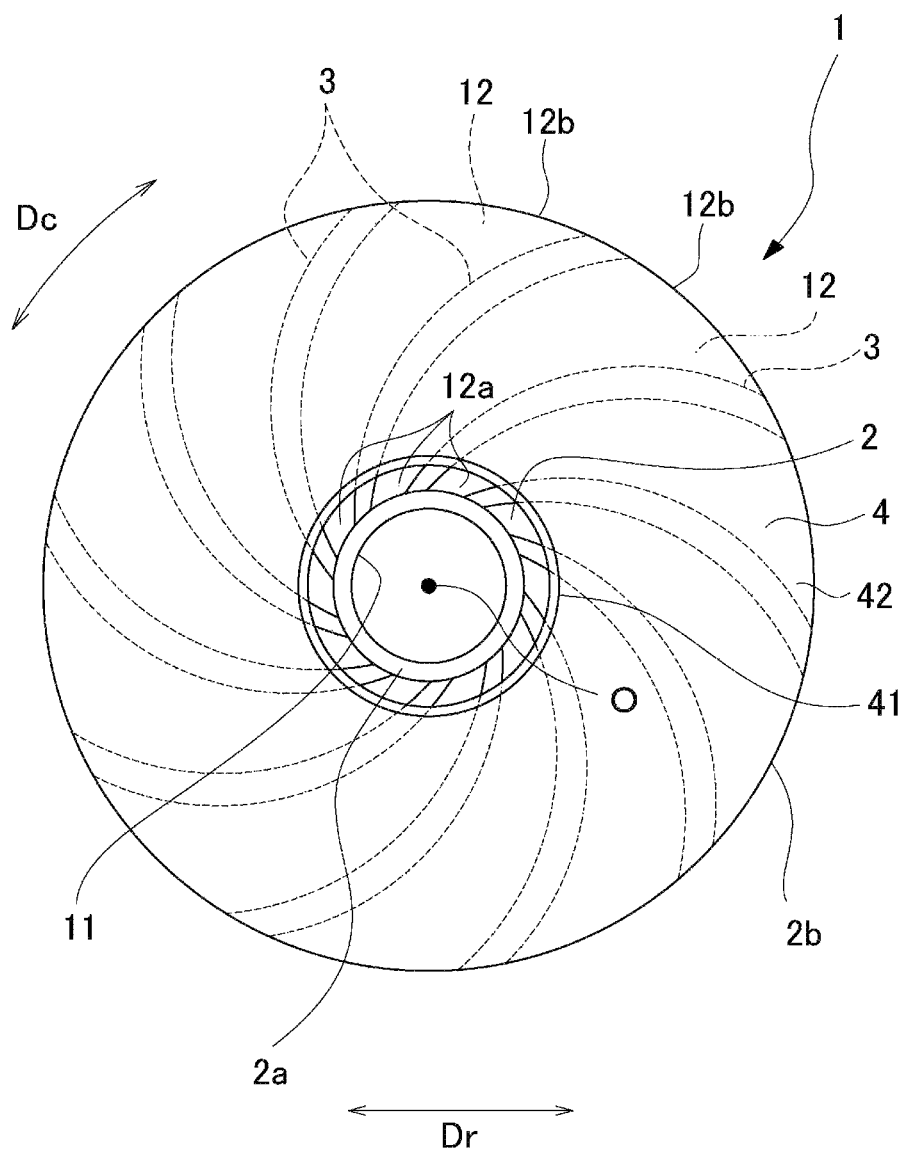
FIG. 1 is a diagram of an impeller produced through an additive manufacturing method according to an embodiment of the present invention viewed in an axial direction of the impeller.
Figure 2:
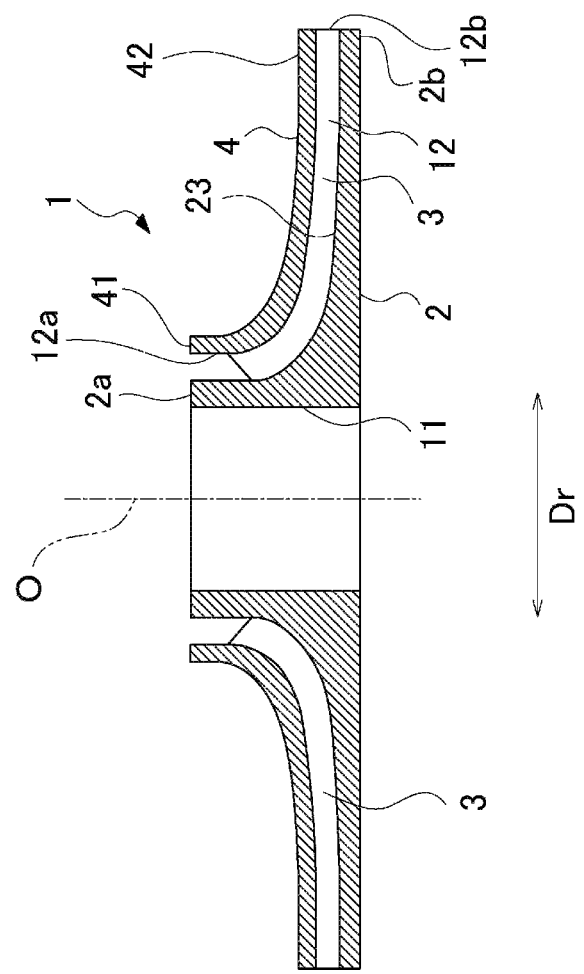
FIG. 2 is a cross-sectional view of the impeller shown in FIG. 1 viewed in a cross section taken along an axis line of the impeller.

An additive manufacturing method and an additive manufacturing device of the present invention will be described with reference to the drawings. FIG. 1 is a diagram of an impeller produced through the additive manufacturing method according to an embodiment of the present invention viewed in an axial direction of the impeller. FIG. 2 is a cross-sectional view of the impeller shown in FIG. 1 viewed in a cross section taken along an axis line of the impeller.

In the additive manufacturing method and the additive manufacturing device according to this embodiment, for example, an impeller installed in a rotating machine such as a centrifugal compressor is formed as a shaped body. The impeller manufactured in this embodiment is installed in, for example, a rotating machine such as a centrifugal compressor. As shown in FIGS. 1 and 2, an impeller 1 includes a disk 2, blades 3, and a cover 4.

The disk 2 is substantially circular when viewed in an axis line O direction in which an axis line O extends. The disk 2 is formed in a circular disc shape centered on the axis line O. To be more specific, the disk 2 is formed so that a dimension of the disk 2 in a radial direction Dr centered on the axis line O gradually increases from an end portion 2a on a first side (the upper side in FIG. 2) thereof in the axis line O direction toward an end portion 2b on a second side (the lower side in FIG. 2) thereof. The disk 2 has a curved surface 23 curved to be recessed toward the second side (the end portion 2b side) thereof in the axis line O direction as a surface facing the first side (the end portion 2a side) thereof in the axis line O direction.

Also, a shaft insertion hole 11 passing through in the axis line O direction is provided in a center of the disk 2. A rotating shaft (not shown) of the rotating machine is inserted into the shaft insertion hole 11 in the axis line O direction. Thus, the impeller 1 is rotatable integrally with the rotating shaft of the rotating machine.

Each of the blades 3 is formed to rise from the curved surface 23 of the disk 2 to the first side thereof in the axis line O direction. The plurality of blades 3 are formed at intervals in a circumferential direction Dc centered on the axis line O with respect to the curved surface 23. Each of the blades 3 extends away from the disk 2 and is formed to extend outward from an inside (the shaft insertion hole 11 side) of the disk 2 in the radial direction Dr.

The cover 4 is provided to have a space in the axis line O direction with respect to the curved surface 23 of the disk 2. The cover 4 is provided to cover the plurality of blades 3 from the first side in the axis line O direction. The cover 4 has a circular disk shape centered on the axis line O. To be specific, the cover 4 has an umbrella shape whose diameter gradually decreases from the second side toward the first side in the axis line O direction. An inner circumferential end portion 41 in the cover 4 is disposed such that there is a space between the inner circumferential end portion 41 and the end portion 2a of the disk 2 in the radial direction Dr. Thus, between the inner circumferential end portion 41 of the cover 4 and the end portion 2a of the disk 2, an opening is provided toward the first side in the axis line O direction. Furthermore, the cover 4 is provided to have a space in the axis line O direction between the cover 4 and the end portion 2b of the disk 2. Thus, between an outer circumferential end portion 42 of the cover 4 and the end portion 2b of the disk 2, an opening is provided outward in the radial direction Dr.

Flow paths 12 are formed inside the impeller 1 by the disk 2, the cover 4, and the blades 3. The flow paths 12 are defined by the blades 3 adjacent to each other in the circumferential direction Dc between the disk 2 and the cover 4. The impeller 1 has a plurality of flow paths 12 in the circumferential direction Dc. Each of the flow paths 12 has a flow path inlet 12a which opens toward the first side in the axis line O direction between the end portion 2a of the disk 2 and the inner circumferential end portion 41 of the cover 4. Furthermore, each of the flow paths 12 has a flow path outlet 12b which opens outward in the radial direction Dr between the end portion 2b of the disk 2 and the outer circumferential end portion 42 of the cover 4. Furthermore, an inner circumferential surface of the flow path 12 is constituted of the curved surface 23 of the disk 2, a surface facing the second side (opposite to the first side) of the cover 4 in the axis line O direction, and a surface of the blade 3 facing in a circumferential direction.

A gap between the disk 2 and the cover 4 is formed to gradually decrease from an inside toward an outside in the radial direction Dr. Furthermore, a gap in the circumferential direction Dc between the blades 3 adjacent to each other in the circumferential direction Dc is formed to gradually increase from the flow path inlet 12a toward the flow path outlet 12b. Each of the flow paths 12 is formed so that its flow path cross-sectional area gradually decreases from the flow path inlet 12a toward the flow path outlet 12b.

Figure 3:
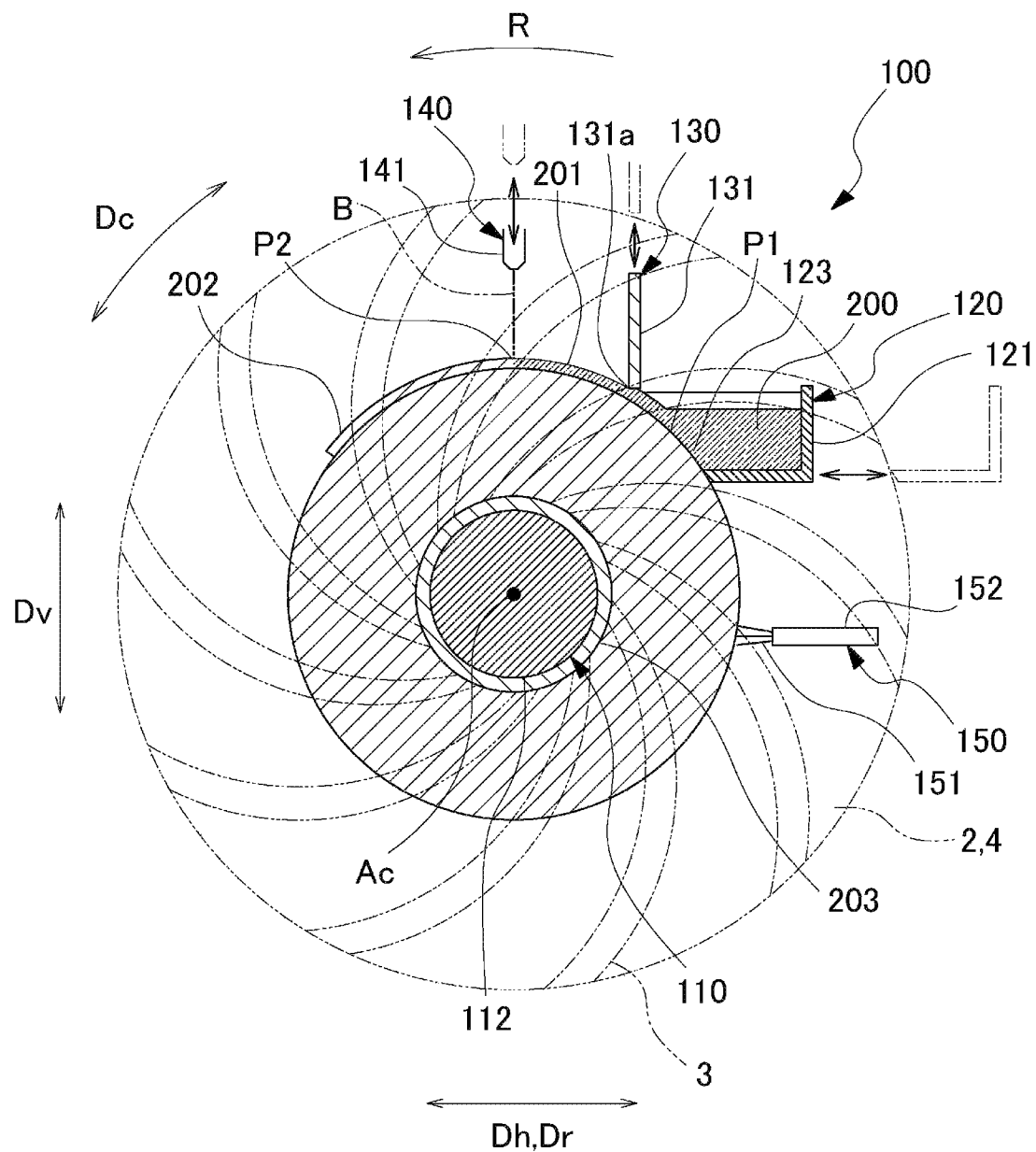
FIG. 3 is a front view of an additive manufacturing device according to the embodiment of the present invention viewed in a center axis direction of a spindle.
Figure 4:
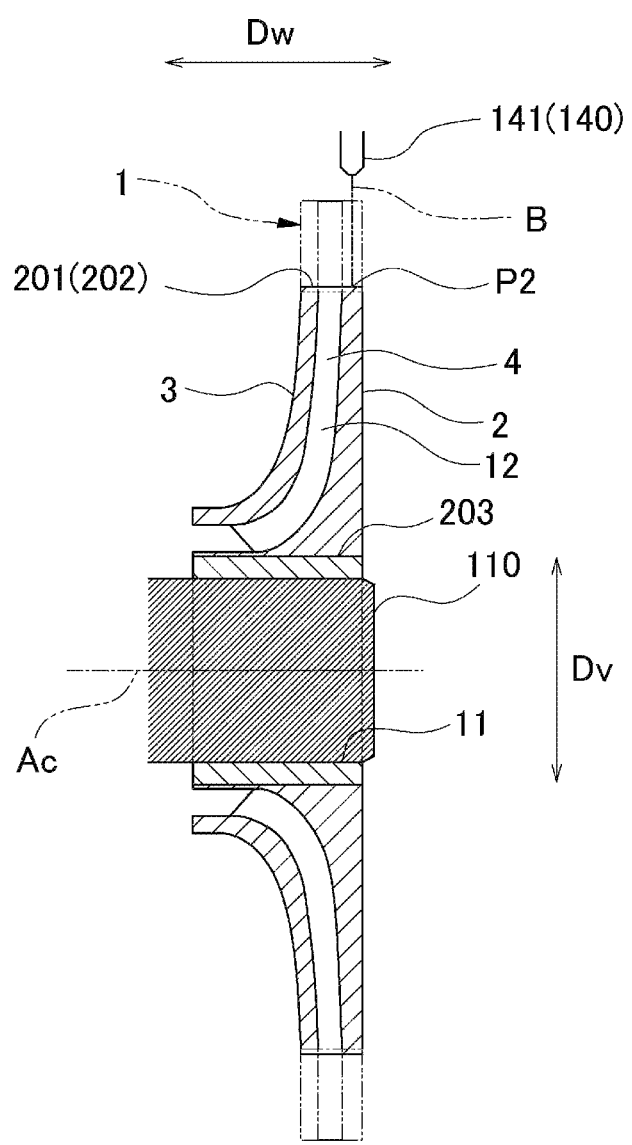
FIG. 4 is a cross-sectional view of the additive manufacturing device shown in FIG. 3 taken along the center axis of the spindle.
Figure 5:
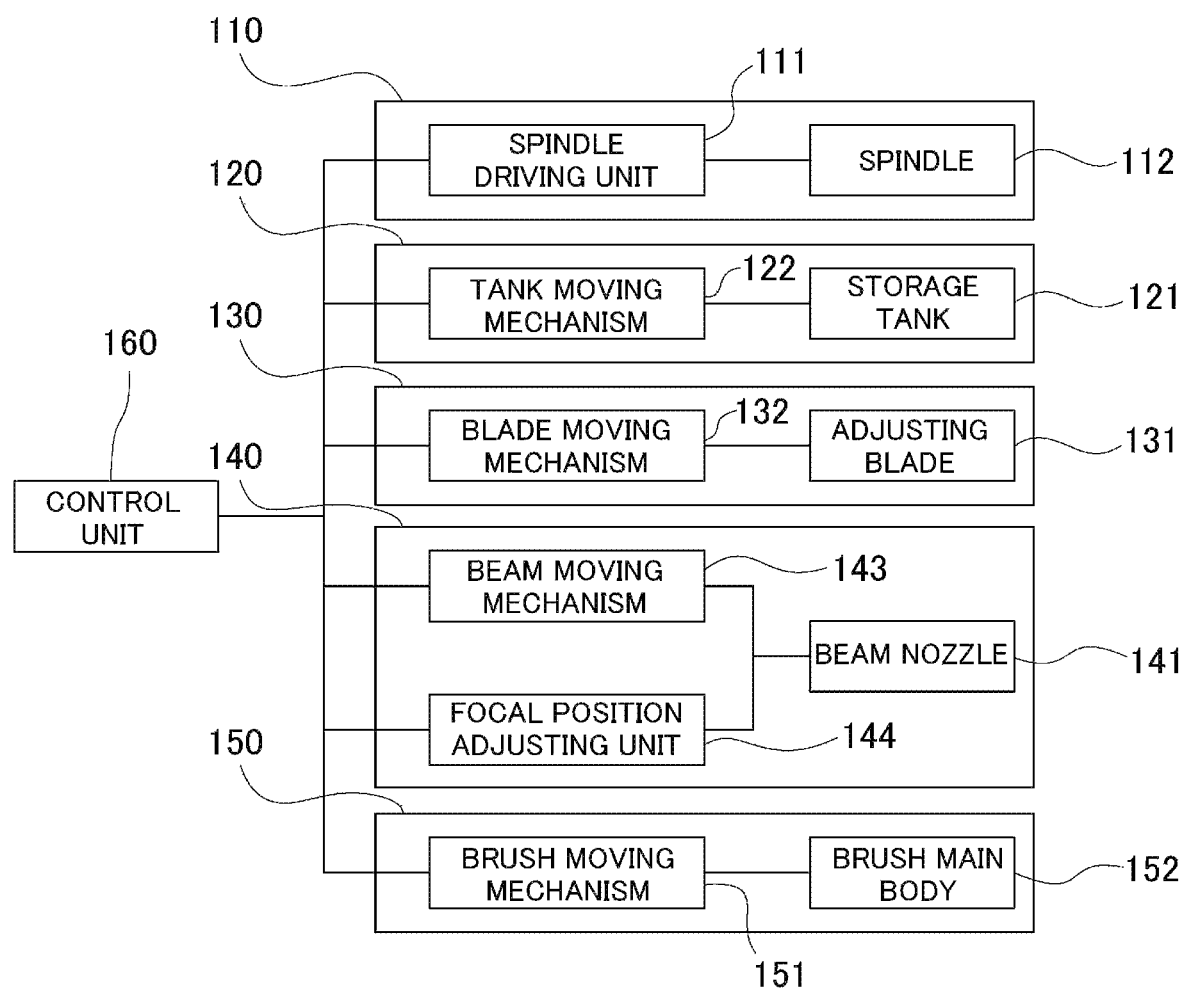
FIG. 5 is a block diagram showing a constitution of a functional unit of the additive manufacturing device shown in FIGS. 3 and 4.

An additive manufacturing device 100 used for forming the impeller 1 will be described below. FIG. 3 is a front view of the additive manufacturing device according to the embodiment of the present invention viewed in a center axis direction of a spindle. FIG. 4 is a cross-sectional view of the additive manufacturing device shown in FIG. 3 taken along the center axis of the spindle. FIG. 5 is a block diagram showing a constitution of a functional unit of the additive manufacturing device shown in FIGS. 3 and 4.

In the additive manufacturing device 100 shown in FIGS. 3 to 5, the impeller 1 described above is formed by the additive manufacturing method. In the additive manufacturing device 100, a metal layer 202 extending in the circumferential direction Dc is laminated from the inside toward the outside in the radial direction Dr, thereby forming the impeller 1 symmetrically formed with the axis line O as a center thereof.

The additive manufacturing device 100 includes a spindle device 110, a material feeding unit 120, a film thickness adjustment unit 130, a beam irradiation unit 140, a brush device 150, and a control unit 160.

The spindle device 110 includes a spindle driving unit 111 (refer to FIG. 5) and the spindle 112.

The spindle 112 is provided to be rotatable about its center axis Ac (in the circumferential direction Dc). The spindle 112 in this embodiment has a columnar shape extending in a horizontal direction Dh. The spindle 112 is driven to be rotatable about a center axis Ac using the spindle driving unit 111 (refer to FIG. 5) such as a motor. A core member 203 is provided as a base outside the spindle 112 in the radial direction Dr.

It should be noted that, although the spindle 112 in this embodiment is disposed so that the center axis Ac extends in the horizontal direction Dh, the center axis Ac is not limited to being disposed to be orthogonal to a vertical direction Dv in this way. For example, the spindle 112 may be disposed so that the center axis Ac is inclined with respect to the vertical direction Dv.

The spindle driving unit 111 rotates the spindle 112 about the center axis Ac. In the spindle driving unit 111, the conditions for rotating the spindle 112 such as a rotation speed and a rotation angle are controlled by the control unit 160.

The core member 203 has a cylindrical shape. The core member 203 has the spindle 112 inserted therein and is fixed to be immovable about the center axis Ac with respect to the spindle 112, for example, through shrinkage fitting or the like and in the center axis Ac direction (a width direction Dw). The core member 203 forms a part of the impeller 1 to be formed. The core member 203 in this embodiment may be formed of the same material as the impeller 1.

It should be noted that the core member 203 is not limited to being formed of the same material as the impeller 1. For example, when a base material (the impeller 1 formed through additive manufacturing) is formed of a material having a poor shrinkage fitting property, the core member 203 may be formed of a material having a good shrinkage fitting property different from that of the base material.

The material feeding unit 120 feeds a shaping material 200 including a metal powder onto the core member (a base) 203 provided outside the spindle 112 in the radial direction Dr to form a powder layer 201. The material feeding unit 120 feeds the shaping material 200 onto the core member 203 to form the powder layer 201 in a tangential direction with respect to an outer circumferential surface of the spindle 112. The material feeding unit 120 in this embodiment includes a storage tank 121 and a tank moving mechanism 122 (refer to FIG. 5).

The storage tank 121 stores the shaping material 200 which contains a metal powder used in the additive manufacturing method. Here, in this embodiment, as the shaping material 200, a slurry-like (paste-like) shaping material obtained by dispersing a metal powder in a dispersion medium and having a viscosity within a prescribed range set in advance is used. Here, the viscosity within a prescribed range is a viscosity of an extent at which the shaping material 200 before being solidified does not fall off the rotating core member 203 downward in the vertical direction Dv. The storage tank 121 includes an opening portion 123 on a side thereof close to the spindle 112. The storage tank 121 is provided to be movable in the horizontal direction Dh relatively with respect to the spindle 112.

The tank moving mechanism 122 moves the storage tank 121 with respect to the spindle 112. The tank moving mechanism 122 moves the position of the storage tank 121 in the horizontal direction Dh. The tank moving mechanism 122 adjusts the position of the storage tank 121 so that the opening portion 123 is pressed against a material feeding site P1 to which the shaping material 200 is to be fed outside in the radial direction Dr of the spindle 112.

The material feeding unit 120 feeds the shaping material 200 stored in the storage tank 121 to the material feeding site P1 outside in the radial direction Dr of the spindle 112 through the opening portion 123.

It should be noted that, although the material feeding unit 120 in this embodiment has a structure in which the material feeding unit 120 directly feeds the shaping material 200 from the storage tank 121 to the material feeding site P1 via the opening portion 123, the material feeding unit 120 is not limited to such a structure. For example, the material feeding unit 120 may have a structure in which the material feeding unit 120 includes a part for feeding other shaping materials 200 such as a brush and a nozzle connected to the storage tank 121 and indirectly feeds the shaping material 200 from the storage tank 121 to the material feeding site P1.

The film thickness adjustment unit 130 adjusts a film thickness of the powder layer 201 formed using the material feeding unit 120. The film thickness adjustment unit 130 in this embodiment includes an adjusting blade 131 and a blade moving mechanism 132 (refer to FIG. 5).

The adjusting blade 131 is disposed on a downstream side in a rotating direction R of the spindle 112 with respect to the opening portion 123 of the storage tank 121 in the material feeding unit 120. The adjusting blade 131 has a plate shape. A lower end portion 131a of the adjusting blade 131 comes into contact with the shaping material 200 fed to the material feeding site P1. The adjusting blade 131 is provided to be movable in the vertical direction Dv relatively with respect to the spindle 112.

The blade moving mechanism 132 moves the adjusting blade 131 in the vertical direction Dv. The blade moving mechanism 132 can change the film thickness of the powder layer 201 by moving the position of the lower end portion 131a in the adjusting blade 131 with respect to an outer circumferential surface of the core member 203.

The film thickness adjustment unit 130 adjusts the position of the adjusting blade 131 using the blade moving mechanism 132 when the shaping material 200 fed to the material feeding site P1 integrally rotates with the spindle 112. By bringing the surface of the powder layer 201 into contact with the lower end portion 131a of the adjusting blade 131 whose position has been adjusted, the surface of the powder layer 201 is smoothly leveled and the film thickness of the powder layer 201 is adjusted.

The beam irradiation unit 140 irradiates a prescribed area of the powder layer 201 formed using the material feeding unit 120 with a beam B for solidifying the shaping material 200. The beam irradiation unit 140 in this embodiment includes a beam nozzle 141, a beam moving mechanism 143 (refer to FIG. 5), and a focal position adjusting unit 144 (refer to FIG. 5).

The beam nozzle 141 is disposed on the downstream side in the rotating direction R of the spindle 112 with respect to the adjusting blade 131. In this embodiment, the beam nozzle 141 is disposed above the center axis Ac of the spindle 112 in the vertical direction Dv. The beam nozzle 141 irradiates the shaping material 200 with the beam B such as a laser or an electron beam supplied from a beam source (not shown) at an irradiation site P2 below the beam nozzle 141 in the vertical direction Dv.

As shown in FIG. 4, the beam moving mechanism 143 moves the beam nozzle 141 in the width direction Dw along the center axis Ac of the spindle 112. Furthermore, the beam moving mechanism 143 moves the beam nozzle 141 in the vertical direction Dv and moves the beam nozzle 141 relative to an outer circumferential surface of the spindle 112.

The focal position adjusting unit 144 adjusts the focal position of the beam B radiated to the shaping material 200 through the beam nozzle 141.

The beam irradiation unit 140 radiates the beam B through the beam nozzle 141 whose position in the vertical direction Dv has been adjusted using the beam moving mechanism 143. The beam irradiation unit 140 irradiates the powder layer 201 with the beam B at the irradiation site P2 located at the uppermost position in the circumferential direction Dc of the spindle 112. The shaping material 200 is sintered and solidified when irradiated with the beam B. The beam irradiation unit 140 irradiates the shaping material 200 only in a portion in which the impeller 1 is to be formed with the beam B while the beam nozzle 141 is moved by the beam moving mechanism 143 in the width direction Dw. After the irradiation with the beam B, the shaping material 200 is solidified to form the metal layer 202.

The brush device 150 is provided on the downstream side in the rotating direction R of the spindle 112 relative to the beam nozzle 141 and on an upstream side in the rotating direction R of the spindle 112 relative to the storage tank 121. The brush device 150 removes portions solidified and protruding from the surface of the metal layer 202. The brush device 150 in this embodiment includes a brush moving mechanism 151 and a brush main body 152.

The brush main body 152 has a distal end portion which is in contact with the surface of the metal layer 202 outside the spindle 112 in the radial direction Dr.

The brush moving mechanism 151 moves relative to the brush device 150 in the horizontal direction Dh with respect to the spindle 112. The brush moving mechanism 151 adjusts the position of the brush device 150 so that a distal end portion of the brush device 150 is pressed against the metal layer 202.

As shown in FIG. 5, the control unit 160 controls the operations of the spindle driving unit 111, the tank moving mechanism 122, the blade moving mechanism 132, the beam moving mechanism 143, the focal position adjusting unit 144, and the brush moving mechanism 151 on the basis of a preset computer program. For example, the control unit 160 sends an instruction to the spindle driving unit 111 to cause the spindle driving unit 111 to rotate the spindle 112 in accordance with the irradiation state of the beam B. The control unit 160 sends an instruction to the tank moving mechanism 122 to cause the tank moving mechanism 122 to move the storage tank 121 in accordance with the rotation state of the spindle 112. The control unit 160 sends an instruction to the blade moving mechanism 132 to cause the blade moving mechanism 132 to move the adjusting blade 131 in accordance with the rotation state of the spindle 112. The control unit 160 sends an instruction to the beam moving mechanism 143 to cause the beam moving mechanism 143 to move the beam nozzle 141 in accordance with the rotation state of the spindle 112. The control unit 160 sends an instruction to the focal position adjusting unit 144 to cause the focal position adjusting unit 144 to adjust the focal position of the beam nozzle 141 in accordance with the rotation state of the spindle 112. The control unit 160 sends an instruction to the brush moving mechanism 151 to cause the brush moving mechanism 151 to move the brush main body 152 in accordance with the rotation state of the spindle 112.

The additive manufacturing method of the impeller 1 using the additive manufacturing device 100 as described above will be described below. The additive manufacturing method of the impeller 1 which will be shown below is automatically executed in the additive manufacturing device 100 by the control unit 160 which performs control based on a preset computer program. It should be noted that the additive manufacturing method of the impeller 1 may be carried out without using the additive manufacturing device 100 in this embodiment.

FIG. 6 is a flowchart showing a flow of the additive manufacturing method according to this embodiment of the present invention. As shown in FIG. 6, the additive manufacturing method of the impeller 1 in this embodiment includes a core member setting step S1, a material feeding step S2, and a beam irradiating step S3.

As shown in FIGS. 3 and 4, in the core member setting step S1, the core member 203 which forms a part of the impeller 1 is installed in the spindle 112. In the core member setting step S1 in this embodiment, the core member 203 is prepared in advance. The prepared core member 203 is fixed in a state in which an inner circumferential surface is in contact with the outer circumferential surface of the spindle 112. Thus, the outer circumferential surface of the core member 203 serves as a base.

In the material feeding step S2, the powder layer 201 is formed on the base while rotating the spindle 112. In the material feeding step S2 in this embodiment, the powder layer 201 is formed using the outer circumferential surface of the core member 203 installed in the spindle 112 in the core member setting step S1 as the base. In the material feeding step S2, the shaping material 200 is fed above a center of the core member 203 installed in the spindle 112 in the vertical direction Dv through the material feeding unit 120.

Here, when a material is fed by the material feeding unit 120, the opening portion 123 of the storage tank 121 is pressed against the material feeding site P1 while rotating the spindle 112 by a prescribed angle in the rotating direction R. The shaping material 200 stored in the storage tank 121 is pressed against the material feeding site P1 through the opening portion 123 and adheres thereto. In this state, when the spindle 112 rotates, the powder layer 201 is formed on the outer circumferential surface of the core member 203. Thus, the shaping material 200 is fed in a band shape continuously in the rotating direction R of the spindle 112, that is, in the circumferential direction Dc with a width having the same dimension as an opening dimension of the opening portion 123 in the width direction Dw at the material feeding site P1.

At that time, the shaping material 200 is in a slurry state having a prescribed viscosity. Thus, the fed shaping material 200 at the material feeding site P1 is prevented from flowing downward in the vertical direction Dv.

Thus, the fed shaping material 200 moves to the downstream side in the rotating direction R with the rotation of the spindle 112. The powder layer 201 has a surface leveled by the adjusting blade 131 of the film thickness adjustment unit 130 and is formed to have a prescribed film thickness.

The beam irradiating step S3 irradiates a prescribed area of the powder layer 201 with a beam to solidify the shaping material 200. The beam irradiating step S3 in this embodiment is performed on the powder layer 201 whose film thickness is adjusted by the film thickness adjustment unit 130 and which reaches the irradiation site P2 due to the rotation of the spindle 112. In the beam irradiating step S3, the beam B is radiated through the beam nozzle 141 of the beam irradiation unit 140.

At this time, the beam irradiation unit 140 moves the beam nozzle 141 using the beam moving mechanism 143 in the width direction Dw along the center axis Ac of the spindle 112 in accordance with a cross-sectional shape of the impeller 1 to be formed. Moreover, only a position in which each part of the impeller 1 is to be formed is irradiated with a beam through the beam nozzle 141. That is to say, the beam irradiation of the beam irradiation unit 140 stops at a portion in which the impeller 1 is not formed. Thus, the shaping material 200 solidifies only at a site at which the impeller 1 is to be formed in the width direction Dw and the metal layer 202 is formed.

Here, when the beam B is radiated while moving the beam B in the width direction Dw, the rotation of the spindle 112 is stopped. That is to say, the spindle 112 rotates during material feeding in the material feeding step S2 and stops while the beam B is radiated in the beam irradiating step S3. In other words, the spindle 112 rotates intermittently.

Upon completion of the beam irradiating step S3 of radiating the beam B, the control unit 160 determines whether the shaping of the impeller 1 is completed and checks the determination (determination step S4). When the shaping of the impeller 1 is not completed, the process returns to the process of the material feeding step S2. That is to say, the material feeding step S2 and the beam irradiating step S3 are repeated until the shaping of the impeller is completed.

As a result, the metal layer 202 extends in the circumferential direction Dc outside the core member 203 in the radial direction Dr. After that, the plurality of metal layers 202 are repeatedly formed over the circumference outward in the radial direction Dr of the core member 203. Thus, the metal layers 202 are sequentially laminated from the inside to the outside in the radial direction Dr on the outer circumferential surface of the core member 203. In this way, the impeller 1 is formed of the metal layers 202 sequentially formed in the circumferential direction Dc.

Incidentally, in the material feeding step S2, it is desirable that a rotation angle at which the spindle 112 is rotated while feeding the shaping material 200 be a rotation angle which is a beam width or less of the beam B to be radiated in the beam irradiating step S3. Thus, in the rotating direction R (the circumferential direction Dc) of the spindle 112, it is possible to form the metal layer 202 by melting the fed shaping material 200 seamlessly.

Also, by repeating the material feeding step S2 and the beam irradiating step S3, the metal layers 202 are laminated from the inside toward the outside in the radial direction Dr. As the metal layers 202 are laminated in the radial direction Dr, the outer diameter of the impeller 1 in the course of being formed gradually increases. Accordingly, the positions of the material feeding site P1 and the irradiation site P2 also move outward in the radial direction Dr. Thus, under the control of the control unit 160, the storage tank 121 is moved outward in the radial direction Dr using the tank moving mechanism 122. Similarly, under the control of the control unit 160, the adjusting blade 131, the beam nozzle 141, and the brush main body 152 are moved outward in the radial direction Dr using the blade moving mechanism 132, the beam moving mechanism 143, and the brush moving mechanism 151.

Also, when it is necessary to change the thickness of the metal layer 202 to be formed, in the film thickness adjustment unit 130, it is possible to adjust the position of the adjusting blade 131 using the blade moving mechanism 132. At that time, the control unit 160 adjusts the focal position of the beam B radiated through the beam nozzle 141 by the focal position adjusting unit 144 in accordance with the position (an estimated value of a film thickness of the shaping material 200) of the adjusting blade 131 adjusted by the blade moving mechanism 132.

When it is determined in the determination step S4 that the shaping of the impeller 1 has been completed, the additive manufacturing device 100 ends a series of additive manufacturing operations. After that, by removing the core member 203 from the spindle 112, performing heat treatment, and polishing treatment on a surface, and the like, as necessary, the impeller 1 is completed.

As described above, when the impeller 1 is formed by the additive manufacturing device 100 using the additive manufacturing method, the disk 2, the blades 3, and the cover 4 constituting the impeller 1 are formed by sequentially laminating the metal layers 202 from the inside toward the outside in the radial direction Dr.

According to the additive manufacturing method and the additive manufacturing device 100 in the above-described embodiment, the disk 2 and the cover 4 extending in a direction which intersects the center axis Ac direction of the spindle 112 can be formed to be laminated from the bottom to the top. Thus, it is possible to mold the impeller 1 having a complicated shape which has been conventionally difficult to form. Furthermore, even with the impeller 1 having a small gap between the disk 2 and the cover 4 and having a narrow flow path 12, it is possible to perform shaping by performing additive manufacturing from the inside in the radial direction Dr toward the outside in the radial direction Dr.

Also, the impeller 1 formed by performing additive manufacturing while rotating the spindle 112 has a high uniformity in the circumferential direction. Therefore, a crystal growth direction of a metal forming the impeller 1 is a direction in which the metal extends from the center axis Ac of the impeller 1 outward in the radial direction Dr. Thus, it is possible to reduce the anisotropy in the strength of the impeller 1 with respect to a centrifugal direction.

Thus, it is possible to form the impeller 1 having a complicated shape and it is possible to form the impeller 1 having a uniform strength distribution in the circumferential direction.

In addition, it is possible to reduce the number of positions in which a support for supporting the disk 2 and the cover 4 in the flow path 12 is formed during additive manufacturing. Thus, it is easier to form the impeller 1 having a complicated shape.

Also, the spindle 112 is intermittently rotated over a rotation angle of the beam width or less of the beam B. Thus, the impeller 1 can be formed by melting the fed shaping material 200 while rotating the spindle 112 without seams. Therefore, a uniform impeller 1 can be obtained.

Also, the shaping material 200 is in a slurry state having a viscosity within a prescribed range. Thus, it is possible to prevent the shaping material 200 fed to the upper side of the spindle 112 from flowing downward. Therefore, the additive manufacturing can be performed while rotating with high accuracy.

Also, by forming the shaping material 200 on the core member 203 installed in the spindle 112, it is possible to efficiently form the impeller 1 using this core member 203 as a base material.

Since the above-described additive manufacturing device 100 includes the film thickness adjustment unit 130, it is possible to increase or decrease a film thickness of the metal layer 202 to be formed through one instance of additive manufacturing. In addition, the focal position of the beam B can be adjusted by the focal position adjusting unit 144 in accordance with the film thickness of the shaping material 200 adjusted by the film thickness adjustment unit 130. Thus, it is possible to melt the shaping material 200 satisfactorily even when the film thickness is increased or decreased.

Although the embodiments of the present invention have been described in detail above with reference to the drawings, the constitutions in the embodiments, the combinations thereof, and the like are merely examples, and additions, omissions, substitutions, and other modifications to the constitutions are possible without departing from the gist of the present invention. Furthermore, the present invention is not limited by the embodiments, but is limited only by the claims.

For example, although the tubular core member 203 is provided in the spindle 112 in the above-described embodiments, the constitution of the core member 203 is not limited at all. For example, a solid columnar core member may be integrally formed with the spindle 112 and additive manufacturing may be performed on an outer circumferential surface of this core member. In this case, the outer circumferential surface of the spindle 112 is substantially the base. Such a solid columnar core member can serve as, for example, the rotating shaft of the impeller 1. That is to say, the impeller 1 and the rotating shaft can be integrally formed by additive manufacturing.

Also, an irradiation direction of the beam B radiated through the beam nozzle 141 is not limited to a direction centered on the center axis Ac of the spindle 112. For example, by inclining the beam nozzle 141 or by offsetting the beam nozzle 141 laterally from the center axis Ac, the surface of the shaping material 200 at the irradiation site P2 may be irradiated with the beam B in the inclination direction.

Also, the center axis Ac of the spindle 112 may be inclined with respect to the horizontal direction Dh. In this case, it is desirable that the core member 203 reliably engage with the spindle 112 to prevent positional deviation of the core member 203.

In addition, the additive manufacturing method and the additive manufacturing device 100 shown in the above-described embodiments can be applied not only to the impeller 1 but also to the shaping of axially symmetrical members such as other rotating bodies. Therefore, the additive manufacturing method and the additive manufacturing device 100 shown in the above-described embodiments can be applied not only to rotating bodies but also to the shaping of various members having an annular shape, a tubular shape, a circular disc shape, or the like.

Also, although the additive manufacturing device 100 in this embodiment has the constitution in which the position of the spindle 112 is fixed and the storage tank 121, the adjusting blade 131, the beam nozzle 141, and the brush main body 152 are moved in accordance with the rotation state of the spindle 112, the present invention is not limited to such a constitution. For example, the positions of the storage tank 121 and the adjusting blade 131 may be fixed and the position of the spindle 112 may be changed. At that time, it is desirable that the spindle 112 be movable in a normal direction of a line segment connecting the connecting points to the storage tank 121 and the adjusting blade 131. Furthermore, the beam nozzle 141 and the brush main body 152 may be movable in accordance with a laminating thickness.

INDUSTRIAL APPLICABILITY

According to the above-described additive manufacturing method and additive manufacturing device, it is possible to form a shaped body having a complicated shape and it is possible to form a shaped body having a uniform strength distribution in a circumferential direction.

REFERENCE SIGNS LIST

1 Impeller (shaped body)
2 Disk
2a End portion
2b End portion
3 Blade
4 Cover
11 Shaft insertion hole
12 Flow path
12a Flow path inlet
12b Flow path outlet
23 Curved surface
41 Inner circumferential end portion
42 Outer circumferential end portion
100 additive manufacturing device
110 Spindle device
111 Spindle driving unit
112 Spindle
120 Material feeding unit
121 Storage tank
122 Tank moving mechanism
123 Opening portion
130 Film thickness adjustment unit
131 Adjusting blade
131a Lower end portion
132 Blade moving mechanism
140 Beam irradiation unit
141 Beam nozzle
143 Beam moving mechanism
144 Focal position adjusting unit
150 Brush device
151 Brush moving mechanism
152 Brush main body
160 Control unit
200 Shaping material
201 Powder layer
202 Metal layer
203 Core member
Ac Center axis
B Beam
Dc Circumferential direction
Dh Horizontal direction
Dr Radial direction
Dv Vertical direction Dw Width direction
O Axis line
P1 Material feeding site
P2 Irradiation site
R Rotating direction
S1 Core member setting step
S2 Material feeding step
S3 Beam irradiating step
S4 Determination step

What is claimed is:

1. An additive manufacturing method, comprising:
   forming a shaped body by repeating:
   a material feeding step of forming a powder layer by feeding a shaping material which includes a metal powder onto a base which is provided outside a spindle in a radial direction thereof while rotating the spindle provided to be rotatable about a center axis; and
   a beam irradiating step of solidifying the shaping material by irradiating a prescribed area of the powder layer with a beam,
   wherein the material feeding step comprises forming the powder layer using an outer circumferential surface of a core member that is in a tubular shape installed in the spindle and forms a part of the shaped body, as the base.

2. The additive manufacturing method according to claim 1, wherein the material feeding step includes rotating the spindle over a rotation angle of a beam width or less of the beam.

3. The additive manufacturing method according to claim 1, wherein the shaping material is in a slurry state having a viscosity within a prescribed range.

4. An additive manufacturing device, comprising:
   a spindle provided to be rotatable about a center axis;
   a spindle driving unit which is configured to rotate the spindle;
   a material feeding unit which is configured to feed a shaping material containing a metal powder onto a base provided outside the spindle in a radial direction to form a powder layer; and
   a beam irradiation unit which is configured to irradiate a prescribed area of the powder layer formed by the material feeding unit with a beam for solidifying the shaping material,
   wherein the material feeding unit is configured to form the powder layer using an outer circumferential surface of a core member that is in a tubular shape installed in the spindle and forms a part of the shaped body, as the base.

5. The additive manufacturing device according to claim 4, further comprising:
   a film thickness adjustment unit which is configured to adjust a film thickness of the powder layer formed by the material feeding unit.

6. The additive manufacturing method according to claim 2, wherein the shaping material is in a slurry state having a viscosity within a prescribed range.

* * * * *